(12) United States Patent
Kang

(10) Patent No.: US 6,710,803 B1
(45) Date of Patent: Mar. 23, 2004

(54) IMAGE SENSOR AND METHOD FOR DRIVING THE SAME

(75) Inventor: Hoai-Sig Kang, Ichon-shi (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/468,857

(22) Filed: Dec. 21, 1999

(30) Foreign Application Priority Data

Dec. 22, 1998 (KR) ......................................... 1998-57223

(51) Int. Cl.[7] .................................................. H04N 9/64
(52) U.S. Cl. ........................ 348/245; 348/302; 348/308
(58) Field of Search ................................ 348/302, 308, 348/245; 257/213

(56) References Cited

U.S. PATENT DOCUMENTS 4,300,163 A * 11/1981 Wada et al. ................. 348/616
5,144,447 A * 9/1992 Akimoto et al. ............. 348/301

* cited by examiner

Primary Examiner—Vu Le
Assistant Examiner—Gary Solomon
(74) Attorney, Agent, or Firm—Jacobson Holman PLLC

(57) ABSTRACT

The CMOS image sensor includes a pixel array with M(row line)×N(column line) unit pixels, M and N being a positive integer, respectively, wherein each unit pixel includes a light sensing element, coupled to a sensing node, for receiving light from an object to generate photoelectric charges, a resetting unit, coupled to the sensing node, for making a fully depleted region within the light sensing unit and providing a reset voltage level to the sensing node in response to a first control signal, wherein the reset voltage level corresponds to a level of the first control signal and is supplied to a unit pixel of a next row line as a power source, arranged on the same column line, an amplifying unit for amplifying the voltage level of the sensing node to generate an amplified signal, wherein a power source of the amplifying unit is derived from a unit pixel of a previous row line, arranged on the same column line, and a switching unit, coupled between the amplifying unit and an output terminal, for performing a switching operation to transfer the amplified signal to the output terminal in response to a second control signal, thereby decreasing the chip size and preventing an erroneous CDS operation.

12 Claims, 5 Drawing Sheets

IMAGE SENSOR AND METHOD FOR DRIVING THE SAME

FIELD OF THE INVENTION

The present invention relates to an image sensor; and, more particularly, to an image sensor and a method for driving the same, in which the chip size is decreased and an erroneous occurrence in a CDS operation can be prevented.

DESCRIPTION OF THE PRIOR ART

Generally, an image sensor is an apparatus to capture images using light sensing semiconductor materials. The image sensor includes a pixel array which contains a plurality of image sensing elements, e.g., photodiode and receives light from an object to generate an electric image signal.

Such an image sensor is disclosed in a copending commonly owned application, U.S. Ser. No. 09/305,756, entitled "CMOS IMAGE SENSOR HAVING COMMON OUTPUTTING TRANSISTORS AND METHOD FOR DRIVING THE SAME" filed on May. 10, 1999.

The control and system interface unit contained in the image sensor controls the image sensor by controlling an integration time, scan addresses, operation modes, a frame rate, a bank and a clock division, and serves as an interface with an external system.

FIG. 2 is a circuit diagram of a conventional pixel array and FIG. 3 is a timing chart illustrating control signals of unit pixel contained in a pixel array shown in FIG. 2.

Referring to FIGS. 2 and 3, a pixel array including MxN unit pixels, arranged in a matrix, senses images from an object. The image sensor generally employs a correlated double sampling (hereinafter, referred to as a CDS), to thereby obtain high picture quality under the control of the control and system interface. In order to implement the CDS, each of the unit pixels includes, e.g., a photodiode and four transistors, respectively. Here, the pixel array is described taking one unit pixel as an example. The four transistors in the unit pixel 101 include a transfer transistor M21, a reset transistor M11, a drive transistor M31 and a select transistor M41. According to the CDS, the unit pixel 100 outputs a reset voltage level as a unit pixel output signal from a voltage source by turning on the select transistor M41 while the reset transistor M11 is kept on a turned-on state under the control of the control and system interface unit. Also, the unit pixel 100 provides a data voltage level as another unit pixel output signal from the photodiode by turning on and off the transfer transistor M21 in a turned-off state of the reset transistor M11 and reading out the photoelectric charges generated in the photodiode 101 under the control of the control and system interface unit. As a result, an unexpected voltage in the unit pixel can be effectively removed and a net image data value can be obtained by using the reset voltage level and the data voltage level as unit pixel output signals.

Referring to FIG. 3, there is shown a timing chart showing the control scheme for the CDS.

The turned-on transfer transistor is turned off and kept on a turned-off state during a predetermined period in response to the transfer control signal Tx1, while the reset transistor and the select transistor are kept on the turned-on state and the turned-off state, respectively.

As shown, the select transistor M41 is turned on in response to a select control signal Sx1 while the reset transistor M11 is kept on the turned-on state and the transfer transistor M21 is kept on the turned-off state, so that a reset voltage level is outputted through the drive transistor M31 and the select transistor M41 as a unit pixel output signal.

The reset voltage level and the data voltage level sampled in the sections "E" and "H" are outputted to the analog-to-digital converter and converted into the digital signals. At this time, a difference between the digital signals corresponds to an image data of the unit pixel.

In such a CDS using four transistors, however, the size of the pixel array is increased and finally, the total size of the image sensor is remarkably increased.

Furthermore, in order for the correct CDS, a pinning voltage of the photodiode should be a reset voltage level. However, the pinning voltage may be different, depending on the characteristic of the formation of the photodiode when the depletion region is made in the photodiode by turning on the transfer transistor and the reset transistor and turning off the select transistor. Additionally, although the voltage levels of the nodes N1 and N2 in FIG. 2 should be maintained at a predetermined level, the pinning voltage of the nodes may be changed due to external erroneous factors. Therefore, there is a problem that the error may occur in the CDS operation.

SUMMARY OF THE INVENTION

It is, therefore, an object of the present invention to provide an image sensor and a method for driving the same, in which the chip size is decreased and an erroneous occurrence in a CDS operation can be prevented.

In accordance with an aspect of the present invention, there is provided a CMOS image sensor including a pixel array with M(row line)×N(column line) unit pixels, M and N being a positive integer, respectively, each unit pixel comprising: a light sensing means, coupled to a sensing node, for receiving light from an object to generate photoelectric charges; a resetting means, coupled to the sensing node, for making a fully depleted region within the light sensing means and providing a reset voltage level to the sensing node in response to a first control signal, wherein the reset voltage level corresponds to a level of the first control signal and is supplied to a unit pixel of a next row line as a power source, arranged on the same column line; an amplifying means for amplifying the voltage level of the sensing node to generate an amplified signal, wherein a power source of the amplifying means is derived from a unit pixel of a previous row line, arranged on the same column line; and a switching means, coupled between the amplifying means and an output terminal, for performing a switching operation to transfer the amplified signal to the output terminal in response to a second control signal.

In accordance with another aspect of the present invention, there is provided a method for driving the CMOS image sensor including a pixel array with M(row line)×N (column line) unit pixels, M and N being a positive integer, respectively, wherein each unit pixel includes a light sensing means, coupled to a sensing node, for receiving light from an object to generate photoelectric charges, a resetting means, coupled to the sensing node, for making a fully depleted region within the light sensing means and providing a reset voltage level to the sensing node in response to a first control signal, wherein the reset voltage level corresponds to a level of the first control signal and is supplied to a unit pixel of a next row line as a power source, arranged on the same column line, an amplifying means for amplifying the voltage level of the sensing node to generate an amplified signal, wherein a power source of the amplifying means is derived from a unit pixel of a previous row line, arranged on the same column line, and a switching means, coupled between the amplifying means and an output terminal, for performing a switching operation to transfer the amplified signal to the output terminal in response to a second control signal, the method comprising the steps of: a) turning on the resetting means, while the switching means is kept on a turned-off state to make a fully depleted region within the light sensing means; b) turning off the resetting means and keeping the turned-off state during a predetermined period, so that the light sensing means generates photoelectric charges; c) turning on the switching means to thereby output a data voltage level corresponding to the photoelectric charges to the output terminal through the amplifying and switching means; d) after a predetermined period, sampling the data voltage level; e) after a predetermined period, turning on and off the resetting means to thereby make a fully depleted region within the light sensing means and output the reset voltage level to the output terminal through the amplifying and switching means; and f) after a predetermined period, sampling a reset voltage level.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
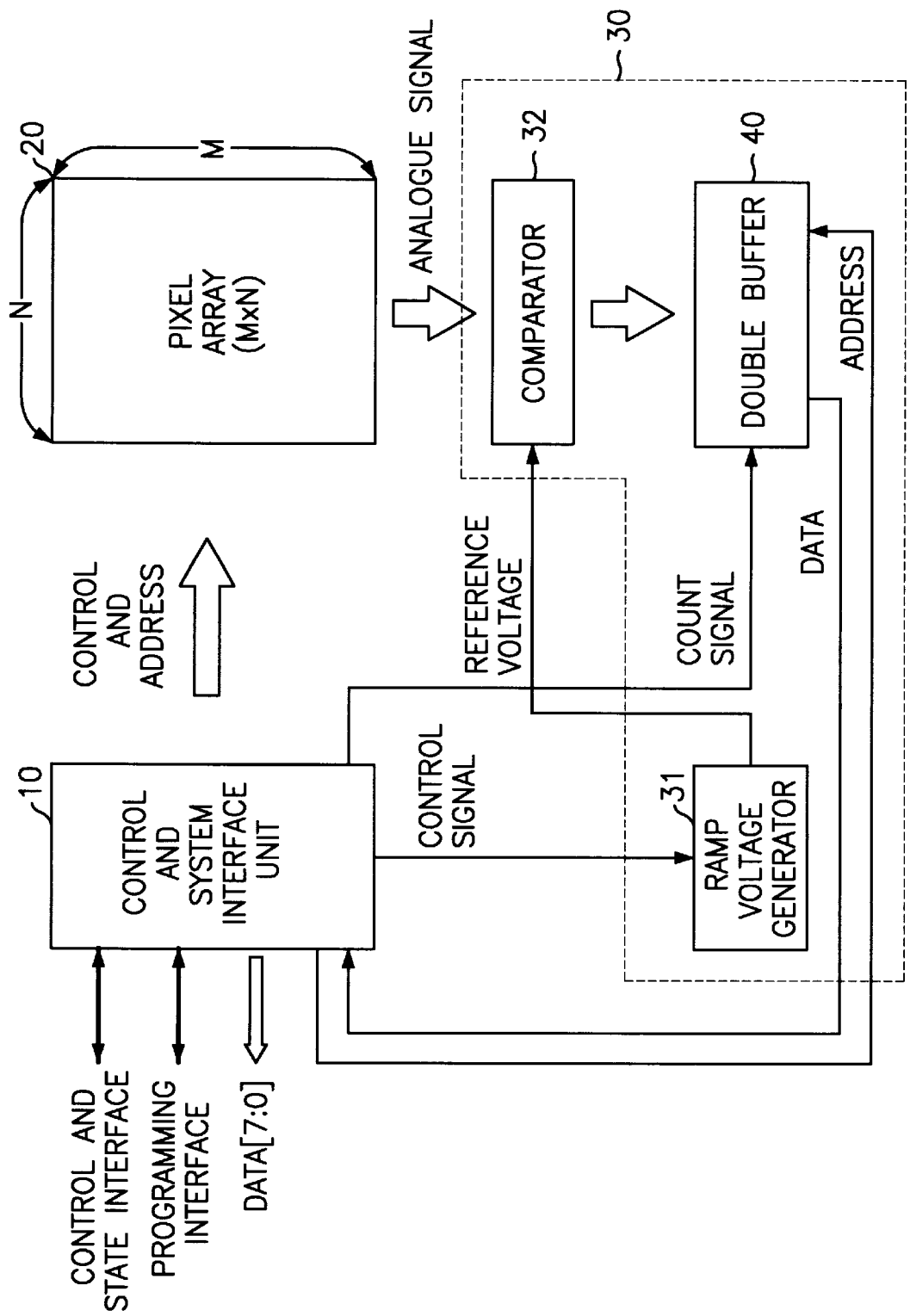
FIG. 1 is a block diagram of a CMOS image sensor.

Referring to FIG. 1, an image sensor includes a control and system interface unit 10, a pixel array 20 having a plurality of image sensing elements, and a single slope A/D converter 30. The single slope A/D converter 30 also includes a ramp voltage generator 31 for generating a reference voltage signal, a comparator (operational amplifier) 32 for comparing the ramp voltage signal with an analog signal from the pixel array 20, and a double buffer 40.

The control and system interface unit 10 controls the image sensor by controlling an integration time, scan addresses, operation modes, a frame rate, a bank and a clock division, and serves as an interface with an external system. The pixel array 20 includes MxN unit pixels, arranged in a matrix, where M and N are positive integers. Each unit pixel has a light sensing element and senses images from an object. The single slope A/D converter 30 converts analog signals including unit pixel output signals from the pixel array 20 into digital signals. This A/D conversion is carried out by comparing the reference voltage with the analog signals in response to a count signal. The converted digital value corresponding to the analog signal is stored in the double buffer 40 as digital data.

Figure 4:
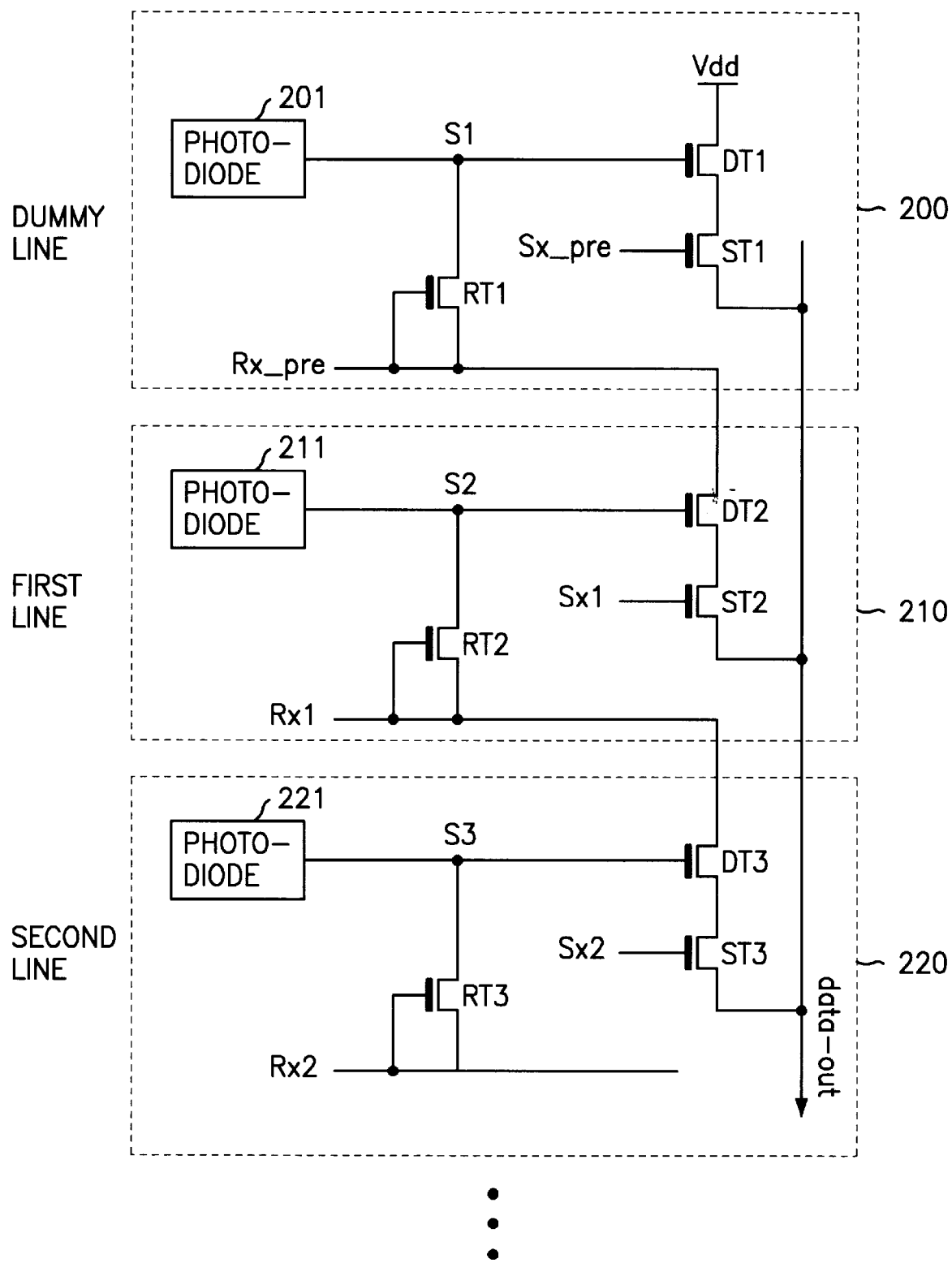
FIG. 4 is a circuit diagram illustrating a pixel array according to the present invention.

FIG. 4 is a schematic diagram illustrating a unit pixel constituting a pixel array. As shown in FIG. 4, the pixel array (20, in FIG. 1) includes a dummy unit pixel and a plurality of unit pixels arranged in a matrix. The dummy unit pixel 200 also includes a photodiode as the light sensing element and three transistors and supplies a potential level to the unit pixel of the first line. Similarly, each of the unit pixels 210 and 220 includes a photodiode as the light sensing element and three transistors, respectively.

Also, the three transistors in the dummy unit pixel 200 includes a dummy reset transistor RT1 as a switching means, a dummy drive transistor DT1 as an amplification means and a dummy select transistor MS1 as a switching means. The photodiode 201 receives light from an object and generates photoelectric charges. The dummy reset transistor RT1 is connected between a sensing node S1 and a control line for applying a dummy reset control signal Rx_pre and transfers a reset voltage level to the photodiode 101 and the dummy drive transistor MD1 through the sensing node S1. The dummy drive transistor DT1 and the dummy select transistor ST1 are serially connected between a power supply voltage level Vdd and an output line data_out. The dummy drive transistor DT1, whose gate is connected to the sensing node S1, acts as a source follower to amplify input signals from the photodiode 101 and the dummy reset transistor MR1. The dummy select transistor MS1, whose gate receives a select control signal Sx_pre, outputs the amplified signal or the reset voltage level as a unit pixel output signal. In accordance with an embodiment of the present invention, the three transistors RT1, DT1 and ST1 can be preferably implemented with NMOS transistors.

The first unit pixel 210 of the first line includes a first reset transistor RT2, a first drive transistor DT2 and a first select transistor ST2 and has the same configuration as the dummy unit pixel 200. A difference is that instead of the dummy reset control signal Rx_pre, a first reset control signal Rx1 is used and a drain of the first drive transistor DT2 receives the dummy reset control signal Rx_pre.

The second unit pixel 220 of the first line includes a second reset transistor RT3, a second drive transistor DT3 and a second select transistor ST3 and has the same configuration as the first unit pixel 210. A difference is that instead of the first reset control signal Rx1, a second reset control signal Rx2 is used and a drain of the second drive transistor DT3 receives the first reset control signal Rx1, not the power supply voltage level Vdd.

The image sensor according to the present invention is based on the correlated double sampling (CDS), thereby obtaining high picture quality.

Figure 5:
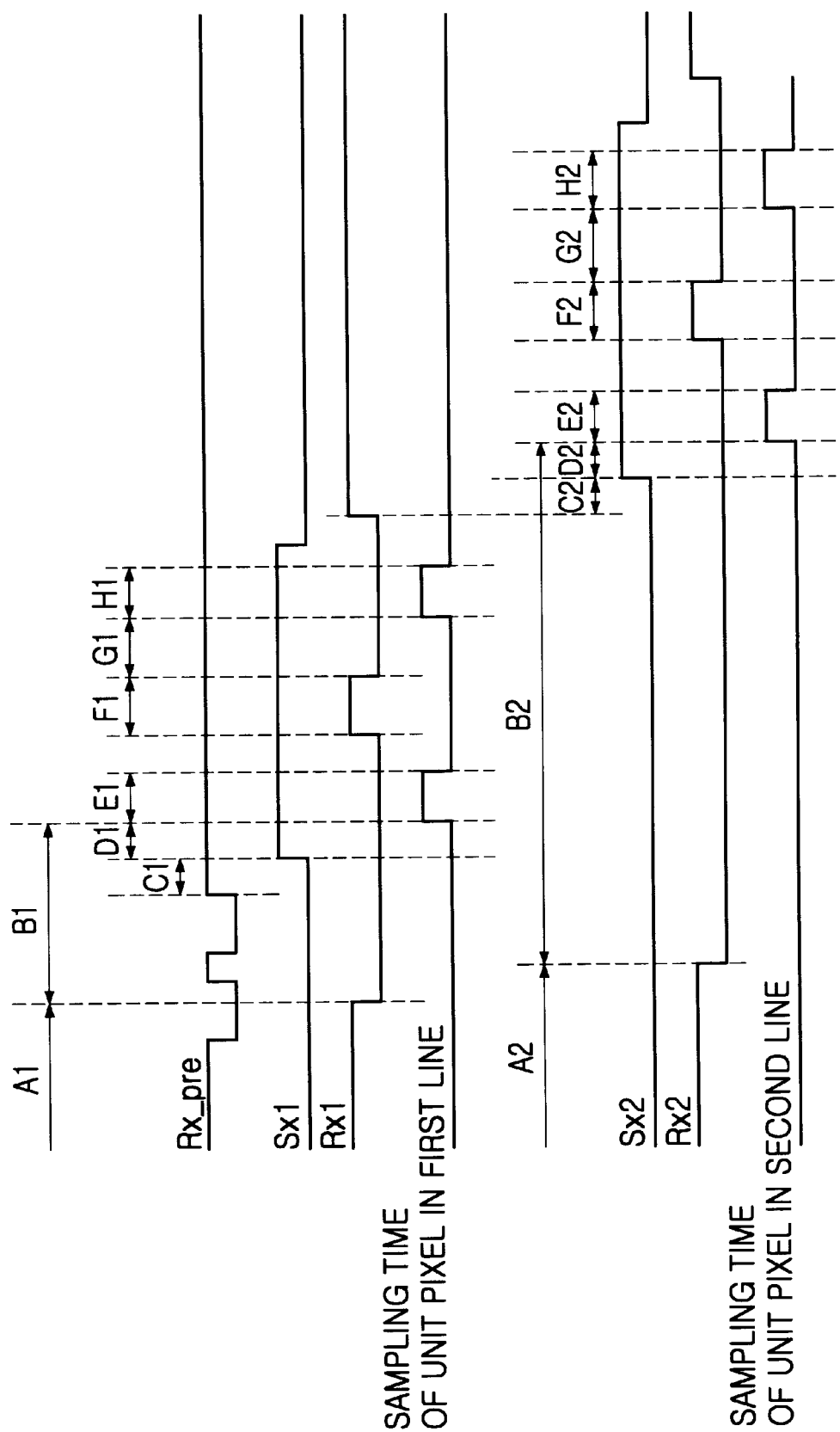
FIG. 5 is a timing chart illustrating control signals of a pixel array shown in FIG. 4.

FIG. 5 shows a timing chart illustrating control signals to control transistors contained in the unit pixel shown in FIG. 4 in accordance with the present invention. The operation of the unit pixels 210 and 220 will be described with reference to FIGS. 4 and 5.

a) In section "A1", the first reset transistor RT2 is turned on in response to a first reset control signal Rx1 while the first select transistor ST2 is kept on a turned-off state, thereby making a fully depletion region in the photodiode 211. This means that the operation of the photodiode is reset; and b) In section "B1", the first reset transistor RT2 is turned off, so that the photodiode 211 generates photoelectric charges.

c) In section "A2", the second reset transistor RT3 is turned on in response to a second reset control signal Rx2 while the second select transistor ST3 is kept on a turned-off state, thereby making a fully depletion region in the photodiode 221.

d) In section "B2", the second reset transistor RT3 is turned off, so that the photodiode 221 generates photoelectric charges.

e) In section "C1", the dummy reset control signal Rx_pre set to a high level is applied to a drain of the first drive transistor DT2 while the first reset transistor RT2 is kept on a turned-off state and the photodiode 211 keeps on generating the photoelectric charges.

f) In section "D1", the first select transistor ST2 is turned on in response to a first select control signal Sx1. Thus, a data voltage level corresponding to the photoelectric charges generated in the photodiode 211 during the section "B1" are transferred to the output line data_out through the first drive and select transistors DT2 and ST2, respectively. The data voltage level is then settled to a predetermined voltage level in the output terminal data_out.

g) In section "E1", the data voltage level of the section "D1" is sampled.

h) In section "F1", the first reset transistor RT2 is turned on in response to the first reset control signal Rx1 while the first select transistor ST2 is kept on a turned-on state. Thus, a reset voltage level is transferred to the output line data_out through the first drive transistor DT2 and the first select transistor ST2.

i) In section "G1", the first reset transistor RT2 is turned off in response to the first reset control signal Rx1 and the reset voltage level generated in the section "F1" is settled to a predetermined level.

j) In section "H1", the reset voltage level of the section "G1" is sampled.

k) In section "C2", the first reset control signal Rx1 set to a high level is applied to a drain of the second drive transistor DT3 while the second reset transistor RT3 is kept on a turned-off state and the photodiode 221 keeps on generating the photoelectric charges.

l) In section "D2", the second select transistor ST3 is turned on in response to a second select control signal Sx2. Thus, a data voltage level corresponding to the photoelectric charges generated in the photodiode 221 during the section "B2" are transferred to the output line data_out through the second drive and select transistors DT3 and ST3. The data voltage level is then settled to a predetermined voltage level in the output terminal data_out.

m) In section "E2", the data voltage level of the section "D2" is sampled.

n) In section "F2", the second reset transistor RT3 is turned on in response to the second reset control signal Rx2 while the second select transistor ST3 is kept on a turned-on state. Thus, a reset voltage level is transferred to the output line data_out through the second drive transistor DT3 and the second select transistor ST3.

o) In section "G2", the second reset transistor RT3 is turned off in response to the second reset control signal Rx2 and the reset voltage level generated in the section "F2" is settled to a predetermined level.

p) In section "H2", the reset voltage level of the section "G2" is sampled.

As can be seen from the above, during the sections "A1" to "H1", the first unit pixel 210 outputs corresponding pixel value, and during the sections "A2" to "H2", the second unit pixel 220 outputs corresponding pixel value.

In similar to the prior art, the data voltage level and the reset voltage level of the first unit pixel 210 which are respectively sampled in the sections "E1" and "H1" are transferred to the analog-to digital converter (30, in FIG. 1) and converted into digital signals. At this time, a difference between the digital signals corresponds to an image data of the first unit pixel 210. Additionally, the data voltage level and the reset voltage level of the second unit pixel 220 which are respectively sampled in the sections "E2" and "H2" are transferred to the analog-to digital converter (30, in FIG. 1) and converted into digital signals. At this time, a difference between the digital signals corresponds to an image data of the second unit pixel 220. Furthermore, the above-mentioned operation can be achieved during the same period as the prior art.

Through the sections "D1", "G1", "D2" and "G2", the voltage level of the sensing nodes S2 and S3 are set to a stable state, and then the sampling operation is performed, so that an undesirable glitch phenomenon is prevented. Here, the glitch phenomenon may occur when the reset transistors RT2 and RT3 and the select transistors ST2 and ST3 are turned on of off.

Figure 2:
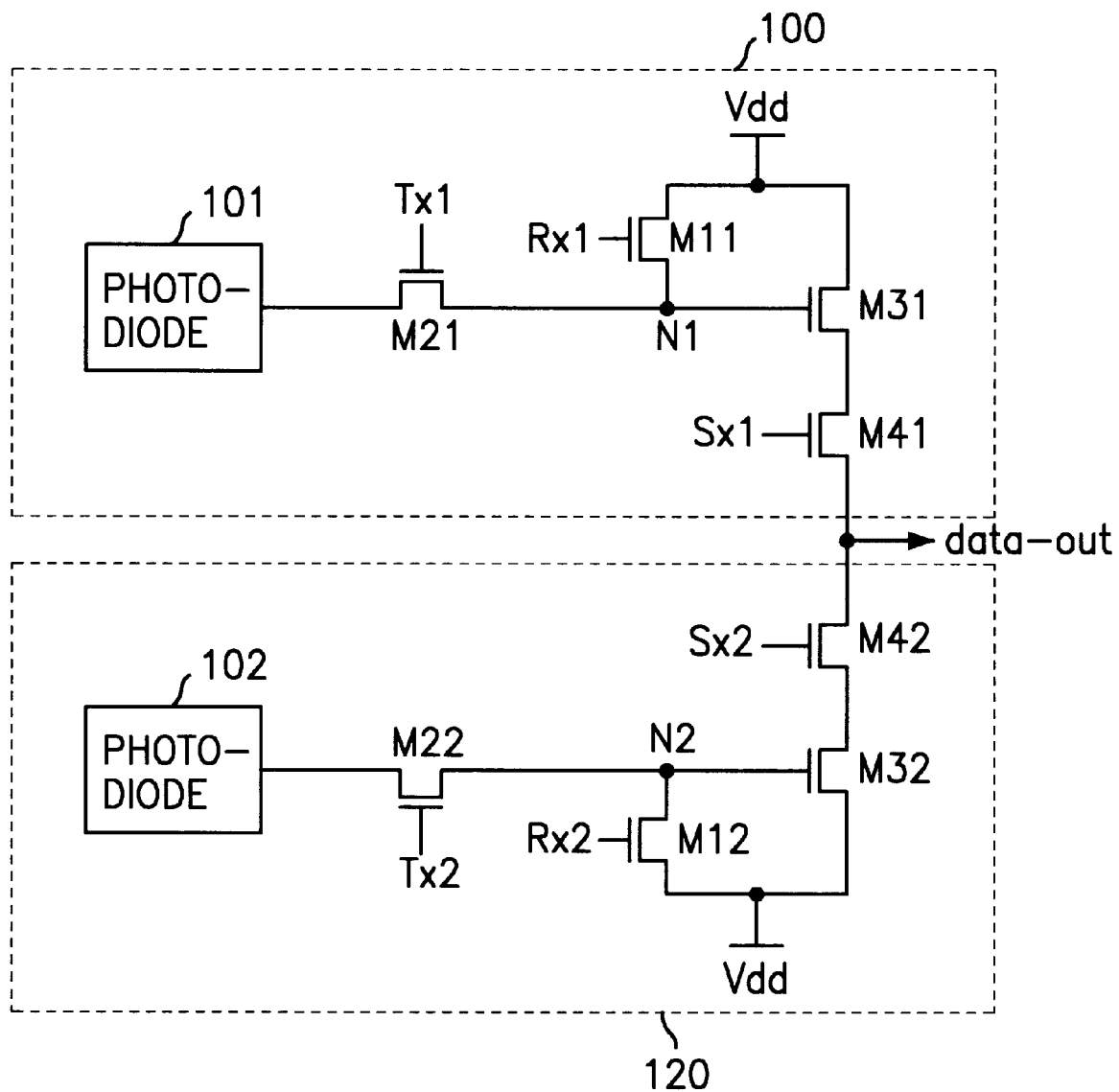
FIG. 2 shows a circuit diagram of a conventional pixel array.
Figure 3:
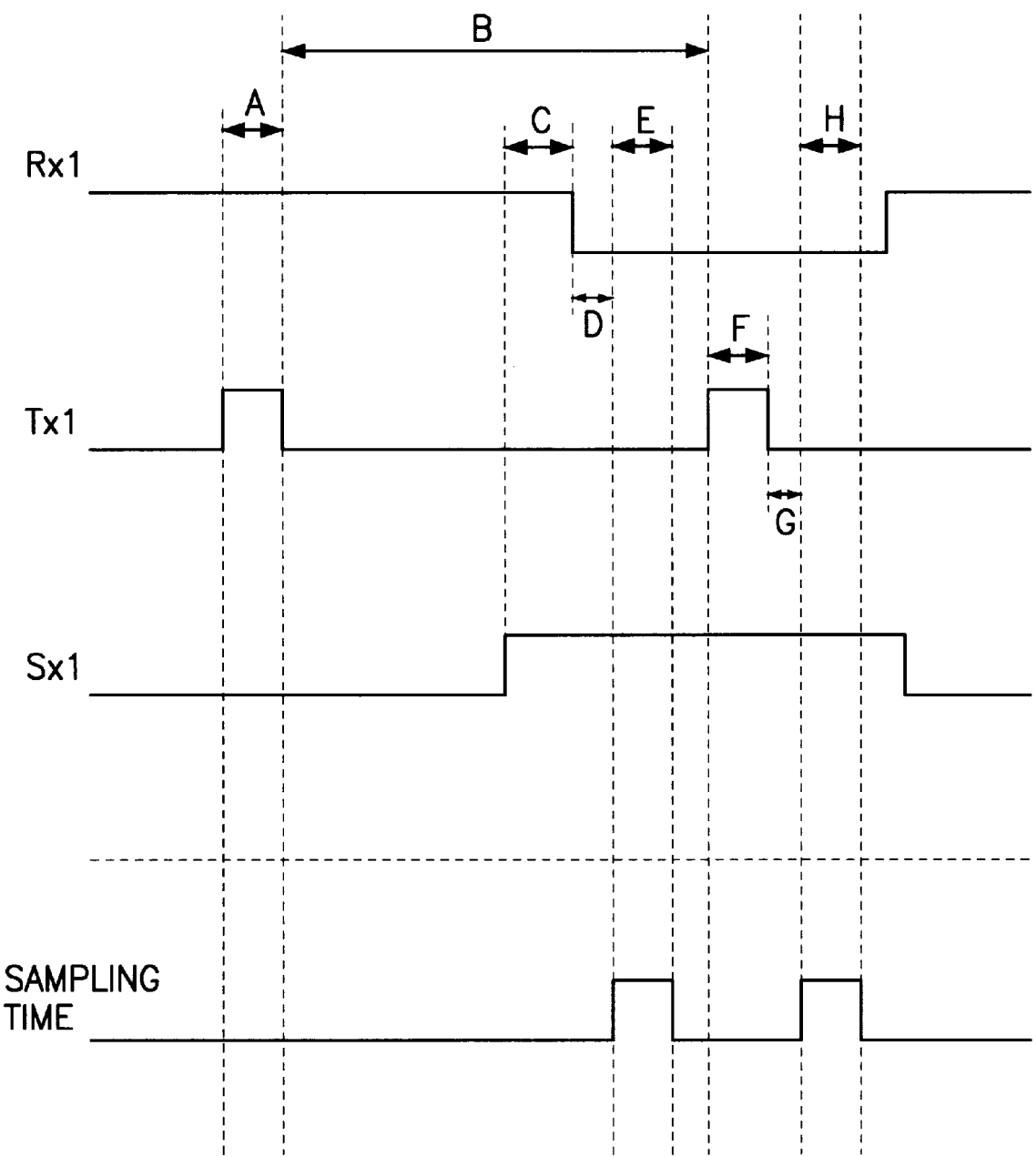
FIG. 3 is a timing chart illustrating control signals of a pixel array in FIG. 2.

Compared with the prior art, it should be noted that the transfer transistors (M21 and M22, in FIG. 2) are removed and first, the data voltage level is read out and then the reset voltage level is read out in order to achieve the CDS. After reading out the data voltage level, the photodiode is pinned and the pinning voltage is then read out, so that a CDS error caused in the CDS operation can be prevented.

In addition, instead of the power line, the reset control signal for the previous unit pixel is used to supply the power supply voltage level, so that the size of the pixel array is remarkable reduced. That is, the reset control signal is used for controlling the reset transistor and supplying the power supply voltage level to the next unit pixel.

As described above, the image sensor includes the dummy unit pixel for supplying the power supply voltage level to the unit pixel in the first line and the pixel array having the unit pixels, each of which is implemented with three transistors, so that the total chip size of the image sensor is remarkably reduced.

While the present invention has been described with respect to certain preferred embodiments only, other modifications and variation may be made without departing from the spirit and scope of the present invention as set forth in the following claims.

What is claimed is:

1. A CMOS image sensor including a pixel array with M(row line)×N(column line) unit pixels, M and N being a positive integer, respectively, each unit pixel comprising:

a light sensing means, coupled to a sensing node, for receiving light from an object to generate photoelectric charges;

a resetting means, coupled to the sensing node, for making a fully depleted region within the light sensing means and providing a reset voltage level to the sensing node in response to a first control signal, wherein the reset voltage level corresponds to a level of the first control signal and is supplied to a unit pixel of a next row line as a power source, arranged on the same column line;

an amplifying means for amplifying the voltage level of the sensing node to generate an amplified signal, wherein a power source of the amplifying means is derived from a unit pixel of a previous row line, arranged on the same column line; and a switching means, coupled between the amplifying means and an output terminal, for performing a switching operation to transfer the amplified signal to the output terminal in response to a second control signal, wherein the resetting means of a current unit pixel is coupled to the amplifying means of a next unit pixel.

2. The CMOS image sensor as recited in claim 1, further comprising a dummy unit pixel for supplying a power supply voltage to a unit pixel of a first row line, arranged on the same column line as the dummy unit pixel, wherein the dummy unit pixel including:

a light sensing means, coupled to a sensing node, for receiving light from an object to generate photoelectric charges;

a resetting means, coupled to the sensing node, for making a fully depleted region within the light sensing means and providing a reset voltage level to the sensing node in response to a first control signal, wherein the reset voltage level corresponds to a level of the first control signal, and is supplied to the unit pixel of the first row line;

an amplifying means for amplifying the voltage level of the sensing node to generate an amplified signal, wherein a power supply voltage of the amplifying means is derived from an external power supply voltage; and a switching means, coupled between the amplifying means and an output terminal, for performing a switching operation to transfer the amplified signal to the output terminal in response to a second control signal.

3. The CMOS image sensor as recited in claim 1, wherein the light sensing means is a photodiode.

4. The CMOS image sensor as recited in claim 1, wherein the resetting means is an NMOS transistor.

5. The CMOS image sensor as recited in claim 4, wherein the amplifying means is an NMOS transistor.

6. The CMOS image sensor as recited in claim 5, wherein the switching means is an NMOS transistor.

7. A method for driving the CMOS image sensor including a pixel array with M(row line)×N(column line) unit pixels, M and N being a positive integer, respectively, wherein each unit pixel includes a light sensing means, coupled to a sensing node, for receiving light from an object to generate photoelectric charges, a resetting means, coupled to the sensing node, for making a fully depleted region within the light sensing means and providing a reset voltage level to the sensing node in response to a first control signal, wherein the reset voltage level corresponds to a level of the first control signal and is supplied to a unit pixel of a next row line as a power source, arranged on the same column line, an amplifying means for amplifying the voltage level of the sensing node to generate an amplified signal, wherein a power source of the amplifying means is derived from a unit pixel of a previous row line, arranged on the same column line, and a switching means, coupled between the amplifying means and an output terminal, for performing a switching operation to transfer the amplified signal to the output terminal in response to a second control signal, the method comprising the steps of:

a) tuning on the resetting means, while the switching means is kept on a turned-off state to make a fully depleted region within the light sensing means;

b) turning off the resetting means and keeping the turned-off state during a predetermined period, so that the light sensing means generates photoelectric charges;

c) turning on the switching means to thereby output a data voltage level corresponding to the photoelectric charges to the output terminal through the amplifying and switching means;

d) after a predetermined period, sampling the data voltage level;

e) after a predetermined period, turning on and off the resetting means to thereby make a fully depleted region within the light sensing means and output the reset voltage level to the output terminal through the amplifying and switching means; and f) after a predetermined period, sampling a reset voltage level.

8. The method as recited in claim 7, wherein the light sensing means is a photodiode.

9. The method as recited in claim 8, wherein the resetting means is an NMOS transistor.

10. The method as recited in claim 9, wherein the amplifying means is an NMOS transistor.

11. The method as recited in claim 10, wherein the switching means is an NMOS transistor.

12. A CMOS image sensor including a pixel array with M(row line)×N(column line) unit pixels, M and N being a positive integer, respectively, each unit pixel comprising:

a light sensing means, coupled to a sensing node, for receiving light from an object to generate photoelectric charges;

a resetting means, coupled to the sensing node, for making a fully depleted region within the light sensing means and providing a reset voltage level to the sensing node in response to a first control signal, wherein the reset voltage level corresponds to a level of the first control signal and is supplied to a unit pixel of a next row line as a power source, arranged on the same column line;

an amplifying means for amplifying the voltage level of the sensing node to generate an amplified signal, wherein a power source of the amplifying means is derived from a unit pixel of a previous row line, arranged on the same column line; and a switching means, coupled between the amplifying means and an output terminal, for performing a switching operation to transfer the amplified signal to the output terminal in response to a second control signal, wherein the amplifying means of a current unit pixel is coupled to the resetting means of a preceding unit pixel.

* * * * *